US012651604B2

(12) United States Patent
Gilboa et al.

(10) Patent No.: US 12,651,604 B2
(45) Date of Patent: Jun. 9, 2026

(54) DEVICE AND METHOD FOR AI-BASED NOISE SUPPRESSION

(71) Applicant: MOTOROLA SOLUTIONS, INC., Chicago, IL (US)

(72) Inventors: Adam Gilboa, Airport City (IL); Leonid Nikolaev, Airport City (IL); Jesus F Corretjer, Weston, FL (US); Oren Afriat, Airport City (IL); Amit Aroch, Airport City (IL); Yulia Louzon, Airport City (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 96 days.

(21) Appl. No.: 18/589,574

(22) Filed: Feb. 28, 2024

(65) Prior Publication Data

US 2025/0273227 A1 Aug. 28, 2025

(51) Int. Cl.
*G10L 21/0232* (2013.01)
*G10L 21/0216* (2013.01)

(52) U.S. Cl.
CPC ..................... *G10L 21/0232* (2013.01); *G10L 2021/02166* (2013.01); *G10L 2021/02168* (2013.01)

(58) Field of Classification Search
CPC ............. G10L 21/0232; G10L 21/0208; G10L 2021/02166; G10L 2021/02168; G10K 11/17827; H04R 3/005; H04R 3/04; H04R 1/1041; G06N 3/0442; G06N 3/0464; G06N 3/0499; G06N 3/08
See application file for complete search history.

(56) References Cited

U.S. PATENT DOCUMENTS

| | | | |
|---|---|---|---|
| 9,640,195 B2 | 5/2017 | Lepauloux et al. | |
| 10,818,309 B2 | 10/2020 | Lee et al. | |
| 2020/0260198 A1* | 8/2020 | Andersen | G06N 3/0442 |
| 2021/0110840 A1 | 4/2021 | Chu et al. | |
| 2022/0124443 A1 | 4/2022 | Courtois et al. | |
| 2022/0369031 A1* | 11/2022 | Lester | G10L 21/028 |
| 2022/0415335 A1 | 12/2022 | Griffin et al. | |

(Continued)

FOREIGN PATENT DOCUMENTS

| | | |
|---|---|---|
| JP | 2010160246 A | 7/2010 |
| JP | 2016184116 A | 10/2016 |

OTHER PUBLICATIONS

The International Search Report and the Written Opinion corresponding patent application serial No. PCT/US2025/014265 filed: Feb. 3, 2025 mailed: Apr. 2, 2025, all pages.

(Continued)

*Primary Examiner* — Yogeshkumar Patel

(57) ABSTRACT

A device, system and method for AI-based noise suppression is provided. The device is configured to perform during a first period of time: applying one or more AI algorithms to an audio data; applying noise suppression to the audio data to generate a noise-suppressed audio data; and providing the noise-suppressed audio data to an output device. The device is further configured to perform during a second period of time, the second period of time following the first period of time: applying the one or more AI algorithms to the audio data to generate an AI-based noise-suppressed audio data; and providing the AI-based noise-suppressed audio data to the output device.

20 Claims, 11 Drawing Sheets

(56) References Cited

U.S. PATENT DOCUMENTS

| | | | | |
|---|---|---|---|---|
| 2023/0041256 | A1* | 2/2023 | Wu | G06F 16/65 |
| 2023/0115674 | A1* | 4/2023 | Nighman | H04R 1/406<br>381/58 |
| 2023/0164475 | A1* | 5/2023 | Chen | H04R 1/1016<br>381/74 |
| 2023/0206938 | A1* | 6/2023 | Deng | G10L 21/0208<br>381/56 |
| 2024/0070110 | A1* | 2/2024 | Hamlin | G06F 15/7871 |

OTHER PUBLICATIONS

Corretjer, Jesus F et al: "Device and Method for Machine-Learning Based Noise Suppression", U.S. Appl. No. 17897,287, filed Aug. 29, 2022, all pages.

* cited by examiner

DEVICE AND METHOD FOR AI-BASED NOISE SUPPRESSION

BACKGROUND OF THE INVENTION

Communication devices for first responders, such as land-mobile radios (LMRs) with microphones and output devices (e.g., a combination of a modem and antenna), generally have tight specifications on times for audio processing. Furthermore, noise suppression may be important in such communication devices, but may introduce delays in audio processing.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
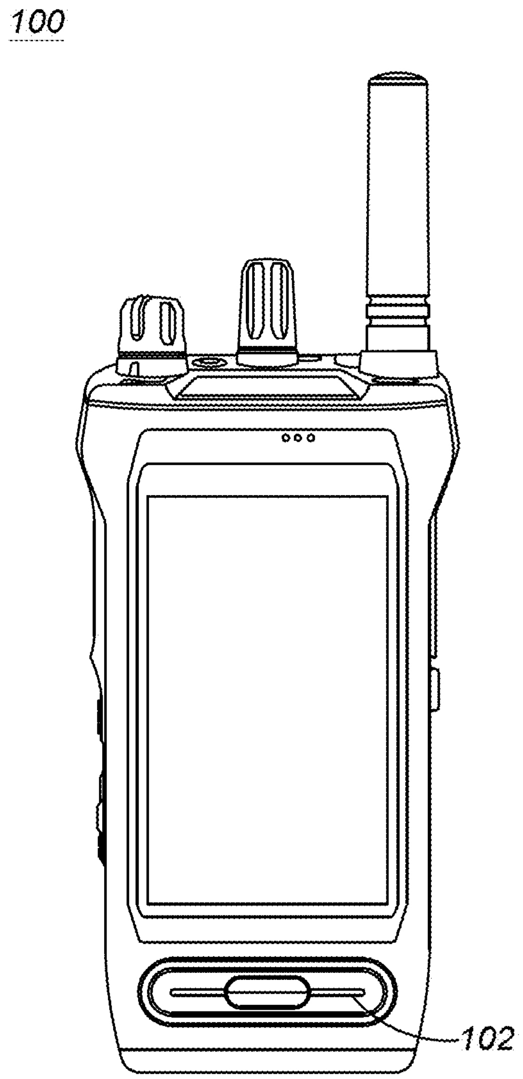
FIG. 1 is a device for AI-based noise suppression, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Communication devices for first responders, such as land-mobile radios (LMRs) with microphones and output devices (e.g., a combination of a modem and antenna), generally have tight specifications on times for audio processing. Furthermore, noise suppression may be important in such communication devices, but may introduce delay in audio processing. In particular, low audio delay and/or low audio latency may be critical in voice communications for first responders. For example, humans can typically tolerate up to 200 milliseconds of end-to-end audio delay while having voice conversations. Otherwise, they tend to talk over each other during voice calls, and other problems may arise. The longer the delay, the more noticeable problems become. Thus, there exists a need for an improved technical method, device, and system for artificial intelligence (AI) based noise suppression.

Hence, provided herein is a device, system, and method for AI-based noise suppression. A communication device provided herein includes a microphone, an output device, as well as a noise suppression engine and an AI noise suppression engine, which operate in parallel. In some examples, the microphone may be provided in the form of a microphone array, though any suitable microphone is within the scope of the present specification. In some examples, the output device may be provided in the form of a combination of a modem and an antenna, though any suitable output device is within the scope of the present specification including, but not limited to, a speaker. In some examples, the device further includes an audio codec engine to convert audio data generated by the microphone into audio data to which noise suppression may be applied.

The noise suppression engine and the AI noise suppression engine may be implemented at different processors, or on a same processor.

For example, the communication device may comprise a baseband processor configured to implement the noise suppression engine, and the communication device may further comprise an audio processor configured to implement the AI noise suppression engine in parallel with the baseband processor implementing the noise suppression engine. In this example, the baseband processor and the audio processor are understood to be in communication with each other, for example via an Inter-processor communication (IPC) mechanism and/or protocol and the like.

However, in other examples, the communication device may comprise a baseband processor, and the like, configured to implement the noise suppression engine and the AI noise suppression engine in parallel.

Regardless, the noise suppression engine and the AI noise suppression engine are generally implemented in parallel at the communication device. Indeed, the communication device provided herein may be configured according to a variety of device structures described in more detail below.

The AI noise suppression engine is generally configured to receive the audio data from the microphone (e.g., via the audio codec engine when present) or the noise suppression engine, depending on a device structure of the communication device. The AI noise suppression engine generally applies one or more AI algorithms to the audio data to generate an AI-based noise-suppressed audio data, and provide the AI-based noise-suppressed audio data to the output device.

The noise suppression engine is generally configured to receive the audio data from the microphone (e.g., via the audio codec engine when present). The noise suppression engine applies conventional non-AI-based noise suppression (e.g., one or more of a Wiener filter, a Personal Alert Safety System (PASS) alarm filter, a wind mitigation algorithm and a spectral subtraction algorithm, and the like) to the audio data to generate noise-suppressed audio data; and provides the noise-suppressed audio data to the output device. In other words, the noise-suppressed audio data is a non-AI-based noise-suppressed audio data generated by applying the non-AI-based noise suppression to the audio data.

Usually, an AI-based noise suppression introduces more delay in audio processing than the non-AI-based noise suppression. Moreover, it takes the AI noise suppression engine more time to converge, i.e. achieve a state during training in which loss settles to within an error range around the final value (in other words, a model converges when additional training will not improve the model). In some cases, especially if the AI noise suppression engine is used on a different dedicated processor running a larger AI model, the convergence time may be significant, for example over 200 milliseconds.

Although the AI noise suppression engine may provide better noise suppression than the non-AI-based noise suppression, the communication device provided herein cannot wait for the one or more AI algorithms to reach convergence. Rather, the communication device provides to the output device the noise-suppressed audio data generated by applying the non-AI-based noise suppression to the audio data, and after the one or more AI algorithms are trained, the device provides to the output device the AI-based noise-suppressed audio data generated by applying the AI-based noise suppression to the audio data.

Hence, the communication device provided herein reduces the overall delay in audio processing by initially using non-AI-based noise suppression and then later, when available, the AI-based noise suppression to further improve the noise suppression.

In some examples, the device further includes a switch configured to switch an input provided to the output device between the noise-suppressed audio data and the AI-based noise-suppressed audio data. In other examples, a functionality of switching may be provided by the other part of the communication device (e.g., the noise suppression engine) as described in more details below.

When the microphone comprises a microphone array, one or both of the noise suppression engine and the AI noise suppression engine may perform beamforming on the audio data prior to applying noise suppression and/or AI-based noise suppression. For example, in device structures where both the noise suppression engine and the AI noise suppression engine receive the audio data from the microphone (e.g., via the audio codec engine when present), both the noise suppression engine and the AI noise suppression engine may perform beamforming. However, in device structures where the noise suppression engine, but not the AI noise suppression engine, receives the audio data, the noise suppression engine may perform beamforming and provide beamformed audio data to the AI noise suppression engine which generates the AI-based noise-suppressed from the beamformed audio data.

A first aspect of the specification provides a device comprising: a microphone; an output device; a noise suppression engine configured to: receive audio data from the microphone; apply noise suppression to the audio data to generate a noise-suppressed audio data; and an AI noise suppression engine configured to: receive the audio data from the microphone or the noise suppression engine; apply one or more AI algorithms to the audio data to generate an AI-based noise-suppressed audio data. The device is further configured to perform during a first period of time: applying the one or more AI algorithms to the audio data; applying the noise suppression to the audio data to generate the noise-suppressed audio data; and providing the noise-suppressed audio data to the output device. The device is further configured to perform during a second period of time, the second period of time following the first period of time: applying the one or more AI algorithms to the audio data to generate the AI-based noise-suppressed audio data; and providing the AI-based noise-suppressed audio data to the output device.

A second aspect of the specification provides a system comprising a device and an audio accessory, wherein the audio accessory comprises an accessory microphone; and an accessory noise suppression engine configured to: receive an accessory audio data from the accessory microphone; and apply a noise suppression to the accessory audio data to generate a noise-suppressed accessory audio data. The device comprises an output device; and an AI noise suppression engine configured to: receive the accessory audio data form the accessory microphone or the noise-suppressed accessory audio data from the accessory noise suppression engine; and apply one or more AI algorithms to the accessory audio data or the noise-suppressed accessory audio data to generate an AI-based noise-suppressed accessory audio data. The system is further configured to: perform during a first period of time: applying the one or more AI algorithms to the noise-suppressed accessory audio data; applying the noise suppression to the accessory audio data to generate the noise-suppressed accessory audio data; and providing the noise-suppressed accessory audio data to the output device. The system is further configured to perform during a second period of time, the second period of time following the first period of time: applying the one or more AI algorithms to the accessory audio data or the noise-suppressed accessory audio data to generate the AI-based noise-suppressed accessory audio data; and providing the AI-based noise-suppressed accessory audio data to the output device.

A third aspect of the specification provides a method comprising: receiving, at a noise suppression engine, audio data from a microphone; receiving, at an AI noise suppression engine, the audio data from the microphone or the noise suppression engine; performing during a first period of time: applying one or more AI algorithms to the audio data; applying a noise suppression to the audio data to generate a noise-suppressed audio data; and providing the noise-suppressed audio data to an output device; and performing during a second period of time, the second period of time following the first period of time: applying the one or more AI algorithms to the audio data to generate the AI-based noise-suppressed audio data; and providing the AI-based noise-suppressed audio data to the output device.

Hence, during the first period of time, the one or more AI algorithms are applied to the audio data to train the one or more AI algorithms. The AI-based noise-suppressed audio data may not be generated during the first period of time. However, even if the AI-based noise-suppressed audio data is generated during the first period of time, it is not provided to the output device during the first period of time.

Similarly, the noise-suppressed audio data may not be generated during the second period of time. However, even if the noise-suppressed audio data is generated during the second period of time, it is not provided to the output device during the second period of time.

At the beginning of a voice call with a high amount of non-stationary ambient noise present at the microphone, an AI-based noise suppression engine may not initially provide adequate noise suppression due to its larger convergence time. In this situation it may be advantageous to start the voice call with non-AI based noise suppression to attempt improved intelligibility at the start of the call and then switch to AI-based noise suppression once that has converged in order to provide superior intelligibility and audio quality for the rest of the call.

The invention may apply to calls, but it may also apply to voice transmissions that are not calls and generally to other forms of audio processing, wherein audio data is received, usually from a microphone, and is provided to an output device.

Each of the above-mentioned aspects will be discussed in more detail below, starting with example system and device architectures in which the embodiments may be practiced, followed by an illustration of processing blocks for achieving an improved technical method, device, and system for machine-learning based noise suppression.

Example embodiments are herein described with reference to flowchart illustrations and/or block diagrams of processes, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. The cloud services may interface with appropriate secondary processor(s) through various interfaces, including the internet, WiFi, Ethernet, broadband cellular systems and/or networks (e.g., LTE, Long Term Evolution) systems and/or networks) and the like, wherein the cloud computing system provides application specific services which may be used independent of, or in tandem with, other computer systems and networks.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Figure 2:
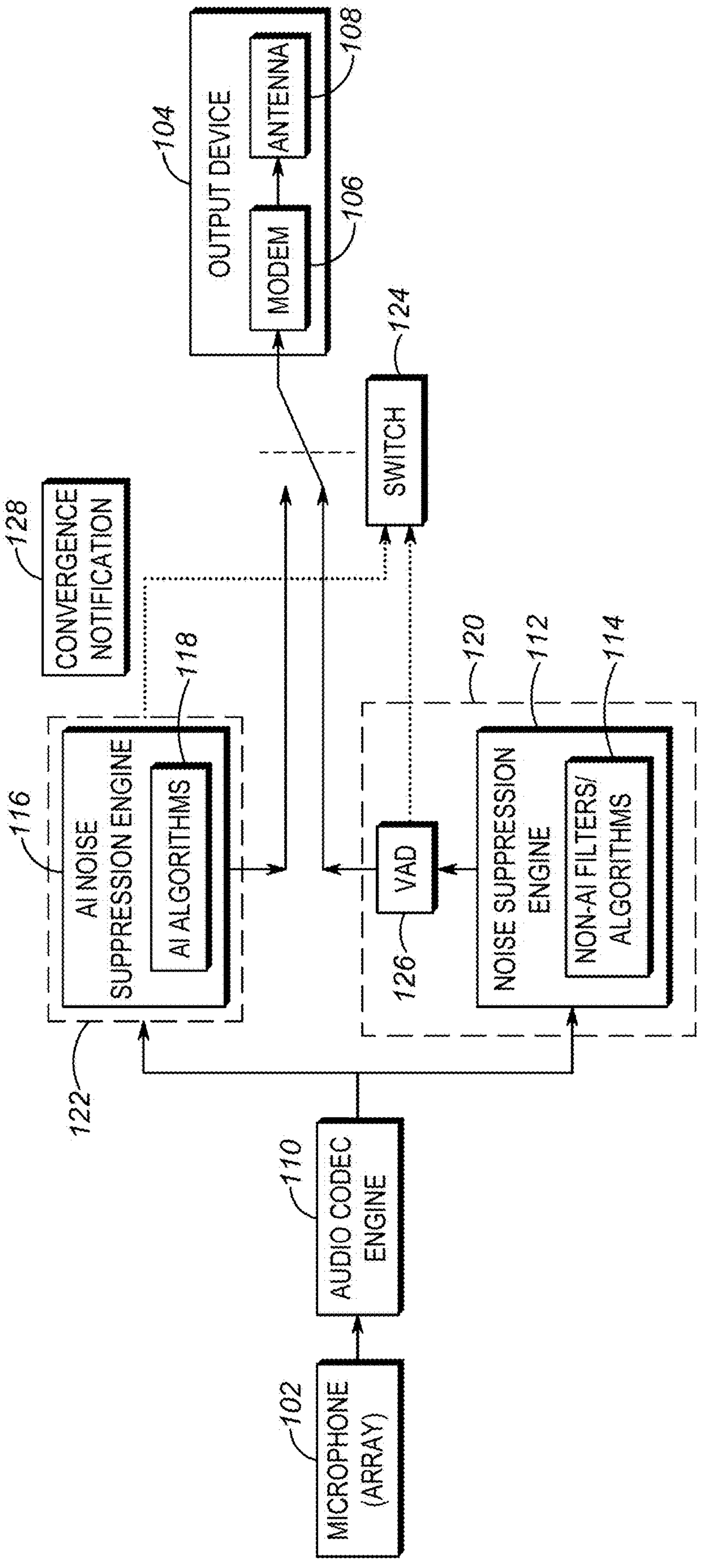
FIG. 2 is a device diagram showing a device structure of the device for AI-based noise suppression, in accordance with some examples.

Attention is directed to FIG. 1 and FIG. 2 that respectively depict a perspective view, and a block diagram, of a device 100 comprising a microphone 102 and which performs AI-based noise suppression as described herein.

As depicted in FIG. 1, the device 100 comprises a mobile radio adapted for use by first responders, enterprise security, and the like, and may specifically comprise a land mobile radio (LMR), and the like, for assisting first responders in responding to incidents.

However, the device 100 may comprise any suitable portable device, partially portable device, and/or non-portable device. In particular examples, the device 100 may comprise any suitable mobile communication device, any suitable portable device, cell phone, a radio, a body-worn camera (e.g., with audio functionality), a remote speaker microphone (RSM), a first responder device, a laptop computer, a headset, and the like, and/or any device that includes a microphone and provides audio data to an output device, as described herein. Furthermore, while the device 100 is described hereafter as having radio functionality, the device 100 may be generally configured for any suitable audio functionality, which may not include radio functionality.

With reference to FIG. 2, the device 100 comprises the microphone 102, and an output device 104. Communication links between components of the device 100 are depicted in FIG. 2 as arrows. While the components depicted in FIG. 2 are understood to be combined in the device 100, in other examples, the components depicted in FIG. 2 may be provided in more than one device, though interconnected with each other, for example as a system for AI-based noise suppression or the mobile communication device paired with a voice accessory (e.g., a Bluetooth speaker accessory).

The microphone 102 may comprise any suitable microphone which may receive sound and convert the sound (e.g., using a transducer) to audio data. Put another way, the microphone 102 may generate the audio data from sound. The microphone 102 may, in some examples, comprise a microphone array such that the audio data generated in conjunction with the microphone 102 may be beamformed, as described in more detail below. However, in other examples, the microphone 102 may not include a microphone array and audio data, generated in conjunction with the microphone 102, may not be beamformed.

The output device 104 may comprise a modem 106 and an antenna 108 and hence the output device 104 may be provided in the form of a transmitter and/or transceiver configured to perform radio functionality for the device 100 such as transmitting noise-suppressed audio data as described herein. Alternatively, and/or in addition, the output device 104 may comprise a speaker for providing and/or playing the noise-suppressed audio data. However, the output device 104 may comprise any suitable output device.

As depicted, the device 100 further comprises an audio codec engine 110, which may be optional, and which, when present, is in communication with the microphone 102. In this example, the microphone 102 may convert the sound into audio data and provide the audio data to the audio codec engine 110. The audio codec engine 110 may receive the audio data and convert the audio data received from the microphone 102 into a different format, such as a given streaming media audio coding format. However, in other examples, the audio codec engine 110 may not be present, and/or functionality of the audio codec engine 110 may be integrated with another component of the device 100, including, but not limited to, the microphone 102 and/or a baseband processor of the device 100 (described below), and/or another processor of the device 100. Hence, hereafter, while reference will be made to components of the device 100 receiving audio data from the microphone 102, it is understood that, in some examples, the audio data may be received from the microphone 102 via the audio codec engine 110, and the like. Regardless, such audio data is understood to be in a format to which noise suppression may be applied.

The device 100 further comprises a noise suppression engine 112 configured to receive audio data from the microphone 102 (e.g., via the audio codec engine 110). In examples, where the microphone 102 comprises a microphone array, the noise suppression engine 112 may perform beamforming on the audio data as received from the microphone array, for example to generate beamformed audio data. As will be described hereafter, the noise suppression engine 112 is generally configured to: apply non-AI-based noise suppression to the audio data (e.g., in the form of the beamformed audio data) to generate noise-suppressed audio data; and provide the noise-suppressed audio data to the output device 104, which outputs the noise-suppressed audio data (e.g., the noise-suppressed audio data may be transmitted via the modem 106 and the antenna 108).

For example, as depicted, the noise suppression engine 112 may implement one or more preconfigured non-AI-based filters and/or algorithms 114, which may include, but is not limited to, one or more of a Wiener filter, a Personal Alert Safety System (PASS) alarm filter, a wind mitigation algorithm, a spectral subtraction algorithm and the like. In particular, such non-AI-based filters and/or algorithms 114 may be applied to audio data to remove noise, for example due to wind, a PASS alarm, and/or other sources of noise, removed without machine learning and/or other AI-based techniques and which may be preconfigured but available without substantial delay. For example, noise, and/or other factors, due to wind, a PASS alarm, and/or other sources of noise, may have known spectral features (e.g., at certain predetermined frequencies) and such known spectral features may be subtracted and/or filtered from the audio data (e.g., using a spectral subtraction algorithm, and the like).

However, such non-AI-based filters and/or algorithms 114 may not provide sufficient noise suppression in all environments in which the device 100 may be located. For example, in some environments, ambient noise may occur which may not be suppressed from the audio data by the non-AI-based filters and/or algorithms 114. For example, the device 100 may be located in an environment with a crying baby and/or or a siren and/or running water, and/or other types of ambient noise which may be unpredictable and hence it may be challenging to provide non-AI-based filters and/or algorithms 114 which suppress such noise.

As such, the device 100 further comprises an AI noise suppression engine 116 which, as depicted, is configured to receive the audio data from the microphone 102 (e.g., via the audio codec engine 110). The AI noise suppression engine 116 is further configured to apply one or more AI algorithms 118 to the audio data to generate an AI-based noise-suppressed audio data and provide the AI-based noise-suppressed audio to the output device 104, directly or via another part of the device 100 (e.g, the noise suppression engine 112, as described below).

In examples, where the microphone 102 comprises a microphone array, the AI noise suppression engine 116 may perform beamforming on the audio data as received from the microphone array, for example to generate beamformed audio data, and the AI noise suppression engine 116 may apply the one or more AI algorithms 118 to the audio data in the form of the beamformed audio data to generate the AI-based noise-suppressed audio data.

However, as will be described below with respect to FIG. 7, the device 100 may alternatively be adapted for other device structures in which the AI noise suppression engine 116 receives the audio data from the noise suppression engine 112. In this example, where the microphone 102 comprises a microphone array, the AI noise suppression engine 116 may not perform beamforming, but rather relies on the noise suppression engine 112 to perform the beamforming, and the audio data received from the noise suppression engine 112 may be in form of beamformed audio data.

Regardless of the source and/or format of the audio data, the AI noise suppression engine 116 may implement one or more AI algorithms 118 to provide the AI-based noise-suppressed audio.

The one or more AI algorithms 118 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, any suitable AI algorithm and/or machine learning algorithm and/or deep learning algorithm and/or neural network is within the scope of present examples.

The one or more AI algorithms 118 may be operated in a training mode to train the one or more AI algorithms 118 to receive audio data (in any suitable format) and output the AI-based noise-suppressed audio.

In some embodiments, the one or more AI algorithms 118, when operate in a training mode, generate AI-based noise suppression parameters, which, when applied to audio data, suppresses noise in the audio data.

The AI-based noise suppression parameters may include, but are not limited to, one or more of: a noise mask; a binary noise mask; a ratio noise mask; a complex noise mask; one or more noise directionality parameters; one or more noise periodicity parameters; one or more noise spectral content parameters; and the like, amongst other possibilities.

A noise mask may comprise a filter which, when applied to audio data, removes and/or reduces given frequencies from the audio data.

Similarly, a binary noise mask may comprise a filter which, when applied to audio data, removes and/or reduces frequencies above or below a given frequency from the audio data.

Similarly, a ratio noise mask may comprise a filter which, when applied to audio data, removes and/or reduces given frequencies from the audio data according to a given ratio.

Similarly, a complex noise mask may comprise a filter which, when applied to audio data, removes and/or reduces given complex frequency components from the audio data.

Noise directionality parameters may comprise parameters, which, when applied to audio data (e.g., via a suitable noise suppression algorithm), removes and/or reduces given frequencies from a given direction from the audio data; such noise directionality parameters may be used when the microphone 102 comprises a microphone array and audio data therefrom has directionality and/or may be beamformed.

Noise periodicity parameters may comprise parameters, which, when applied to audio data (e.g., via a suitable noise suppression algorithm), removes and/or reduces given periodic frequency components from the audio data. Such periodic frequency components may be periodic in time and/or such periodic frequency components may be periodic in frequency (e.g., similar to harmonic frequencies).

Noise spectral content parameters may comprise parameters, which, when applied to audio data (e.g., via a suitable noise suppression algorithm), removes and/or reduces given spectral content from the audio data (e.g., over a given frequency range and/or according to a given spectral shape over the given frequency range).

It is understood that the one or more AI algorithms 118 are generally trained to generally and/or generically identify different types of noise in audio data and output the AI-based noise-suppressed audio, for example by applying the AI-based noise suppression parameters which suppress such noise.

For example, the audio data may include noise that includes periodic frequencies which are not suppressed using the non-AI filters and/or algorithms 114; and the one or more AI algorithms 118 may identify such periodic frequencies and generate the AI-based noise suppression parameters which, when applied to the audio data, suppresses such periodic frequencies in the audio data. For example, as different noise sources may produce different types of periodic frequencies, preconfiguring the noise suppression engine 112 to suppress such periodic frequencies may be challenging, and the one or more AI algorithms 118 may be used to identify such periodic frequencies.

Similarly, the audio data may include noise that includes frequencies that occur according to a certain spectral shape (e.g., a crying baby) which are not suppressed using the non-AI-based filters and/or algorithms 114; and the one or more AI algorithms 118 may identify such a spectral shape of frequencies and generate the AI-based noise suppression parameters which, when applied to the audio data, suppresses such a spectral shape of frequencies in the audio data. For example, as different babies may produce different spectral shapes of frequencies when crying, preconfiguring the noise suppression engine 112 to suppress such spectral shapes may be challenging, and the one or more AI algorithms 118 may be used to identify such spectral shapes.

Hence, in general, the AI noise suppression engine 116 may receive the audio data in any suitable format, apply the one or more AI algorithms 118 to the audio data to analyze the audio data for noise, and generate the AI-based noise-suppressed audio data.

However, as it may take time for the AI noise suppression engine 116 to generate the AI-based noise-suppressed audio data and/or to reach convergence, the device 100 does not wait for the AI-based noise-suppressed audio before providing any audio data to the output device 104.

Rather, prior to providing the AI-based noise-suppressed audio data by the AI noise suppression engine and/or prior to reaching convergence by the one or more AI algorithms, the output device receives from the noise suppression engine 112 the noise-suppressed audio data generated using the one or more non-AI noise suppression filters and/or algorithms 114. Hence, noise suppression occurs at the noise suppression engine 112 upon receiving the audio data from the microphone 102 (e.g., via the audio codec engine 110).

However, after providing the AI-based noise-suppressed audio data by the AI noise suppression engine and/or after reaching convergence by the one or more AI algorithms, the output device 104 receives the AI-based noise-suppressed audio data. In some embodiments, the non-AI filters and/or algorithms 114 may be applied to the AI-based noise-suppressed audio data such that the audio data benefits from noise suppression both due to the non-AI filters and/or algorithms 114 and the one or more AI algorithms 118.

Also depicted in FIG. 2 is a two-processor device structure of the device 100. In particular, as depicted, the device 100 comprises a baseband processor 120 and an audio processor 122 in communication with each other for example via an IPC mechanism and/or protocol and the like. Hence, the processor 120, 122 are generally configured to communicate with each other to exchange data as described herein.

Furthermore, as depicted the baseband processor 120 is configured to implement the noise suppression engine 112, and the audio processor 122 is configured to implement the AI noise suppression engine 116 in parallel with the baseband processor 120 implementing the noise suppression engine 112.

The baseband processor 120 may comprise any suitable processor which implements the noise suppression engine 112 and which may implement any other suitable functionality of the device 100, such as the audio codec engine 110, and the like. Indeed, it is understood that a baseband processor may comprise any suitable processor that assists at converting digital data into radio frequency signals (and vice-versa) which can then be transmitted over a RAN (Radio Access Network), for example using the modem 106 and the antenna 108 of the output device 104.

Furthermore, as depicted, the output device 104 may be entirely external to a processor implementing the noise suppression engine 112. However, in other embodiments, the output device may be entirely or partially integrated into the baseband processor 120. For example, modem 106 of the output device 104 may be integrated into the baseband processor 120, though the antenna 108 of the output device 104 may be external to the baseband processor 120.

The audio processor 122 may comprise any suitable processor and/or digital signal processor (DSP), which may be dedicated to implementing the AI noise suppression engine 116. Hence, in some examples, the device 100 may comprise an LMR that includes a suitable baseband processor 120, and which has been modified to include the audio processor 122 to generate AI-based noise-suppressed audio in parallel with the baseband processor 120 performing noise suppression. While the processors 120, 122 are respectively described with respect to a baseband processor and an audio processor (e.g., a DSP), the processor 120, 122 may comprise any suitable processors.

Furthermore, such a device structure may ensure that the device 100 meets given audio delay specifications (e.g. such as less than 200 milliseconds of end-to-end audio delay while having voice conversations). Other device structures for the device 100 are described below with respect to FIG. 6, FIG. 7, FIG. 8, and FIG. 9, which may also ensure that the device 100 meets given audio delay specifications (e.g. such as less than 200 milliseconds of end-to-end audio delay while having voice conversations).

While not depicted, it is understood that the device 100 may comprise any suitable combination of memories (e.g., a Random-Access Memory (RAM), a code Read Only Memory (ROM)) for electronically storing instructions to provide functionality for the device 100 as set forth throughout this description and attached figures, as well as a common data and address bus and the like.

Furthermore, it is understood that the output device 104 may include (and/or be a component of) any suitable combination of wireless (and/or wired) transceivers, wireless (and/or wired) input/output (I/O) interfaces etc. for providing radio functionality to the device 100 (e.g., as well as a combined modulator/demodulator of which the modem 106 may be a component). Similar to as depicted in FIG. 2, at least a portion of such transceivers (e.g. such as the modem 106) may be integrated with the baseband processor 120.

Hence, one or more transceivers of the device 100 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, one or more transceivers of the output device 104 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The processors 120, 122 may include one or more logic circuits, one or more processors, one or more microprocessors, one or more GPUs (Graphics Processing Units), and/or the processors 120, 122 may include one or more ASIC (application-specific integrated circuits) and one or more FPGA (field-programmable gate arrays), and/or another electronic device.

As depicted, the device 100 further comprises a switch 124, which may be optional, and which, when present, is configured to switch an input provided to the output device 104 from the noise-suppressed audio data to the AI-based noise-suppressed audio data. In some embodiments the switch 124 may be further configured to switch off providing the audio data to the noise suppression engine from the microphone 102 or from the audio codec engine 110.

In some examples (not illustrated), the switch 124 may be configured to trigger providing the AI-based noise-suppressed audio data to the output device 104 after a predefined period of time. The predefined period of time may be based on a convergence time. The convergence time may be determined by the measurements performed for the AI noise suppression engine 116. The convergence time is a time in which the one or more AI algorithms 118 reach convergence. The predefined period of time may be configurable (e.g., via a customer programming software). The predefined period may be, for example, 3 seconds, 2 seconds, 1 second, 500 milliseconds, 300 milliseconds, 200 milliseconds, or 100 milliseconds.

In other examples (depicted), the switch 124 may be configured to receive a convergence notification 128 from the AI noise suppression engine 116 or from the audio processor 122 indicating that the AI algorithms 118 reached convergence. Therefore, the switch can be triggered by receiving the convergence notification 128. In other words, the device 100 may be configured to trigger providing the AI-based noise-suppressed audio data to the output device based on a reception of the convergence notification.

Although the switch 124 is depicted as external to the baseband processor 120 and to the audio processor 122, in some embodiments it can be integrated into the one of the processors.

Other possible structures and examples ensuring the functionality of triggering providing the AI-based noise-suppressed audio data to the output device are described below with respect to FIG. 6 and FIG. 7.

Regardless the way of determining a sufficient convergence time and/or the source of a triggering signal, a sudden switching between the noise-suppressed audio and the AI-based noise-suppressed audio is usually not optimal because of differences of delay between an AI-based and non-AI-based audio processing. Therefore, in some embodiments a Voice Activity Detection (VAD) (also known as speech activity detection or speech detection) is used to detect the presence or absence of speech and to provide switching between the noise-suppressed audio and the AI-based noise-suppressed audio at a time during a non-speech section of the noise-suppressed audio data 307.

As depicted in the attached figures, the device 100 further comprises a VAD engine 126, which may be optional, and which, when present, provides a VAD signal to the switch 124, the VAD signal indicating presence and/or lack of speech. Hence, the switching between the noise-suppressed audio and the AI-based noise-suppressed audio may be performed when a long enough stretch of non-speech is detected.

Figure 7:
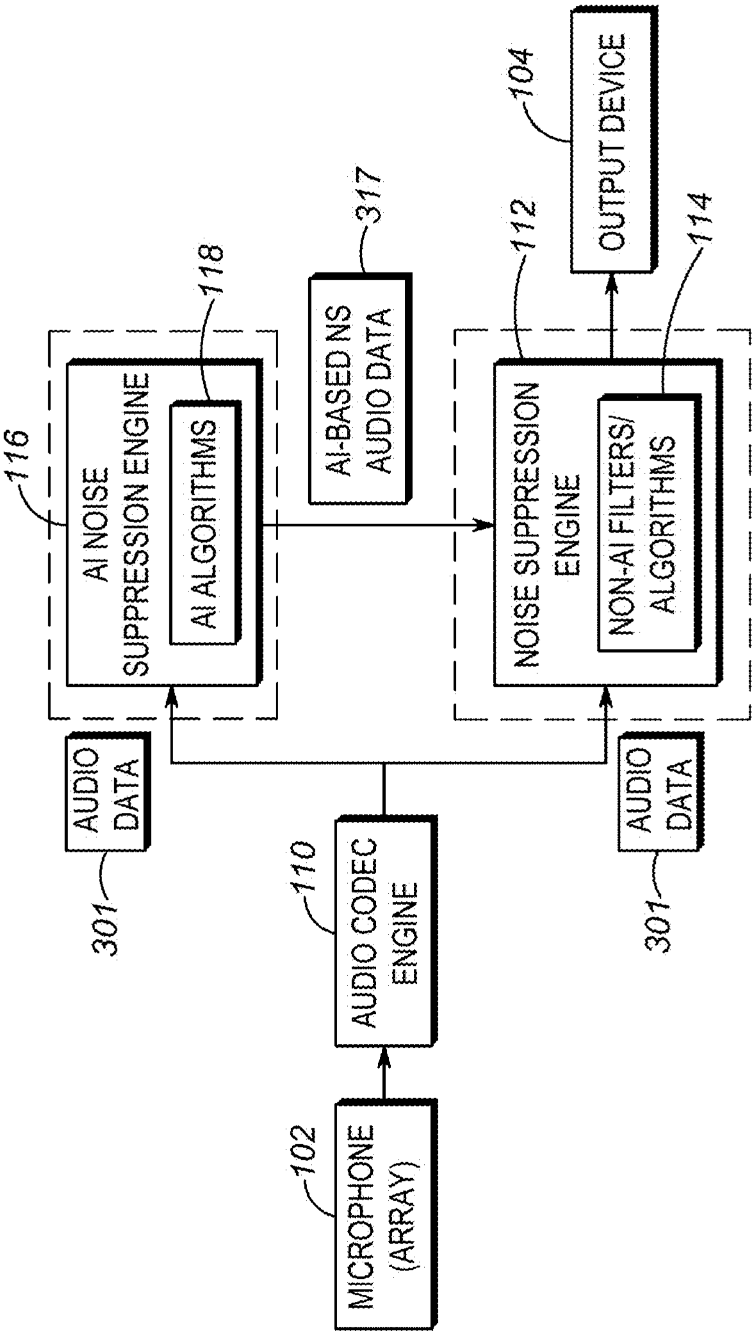
FIG. 7 is a device diagram showing a second alternative device structure of the device for AI-based noise suppression, in accordance with some examples.

In some examples, a VAD functionality may be provided by the noise suppression engine 112 (as depicted in FIG. 7).

Figure 3:
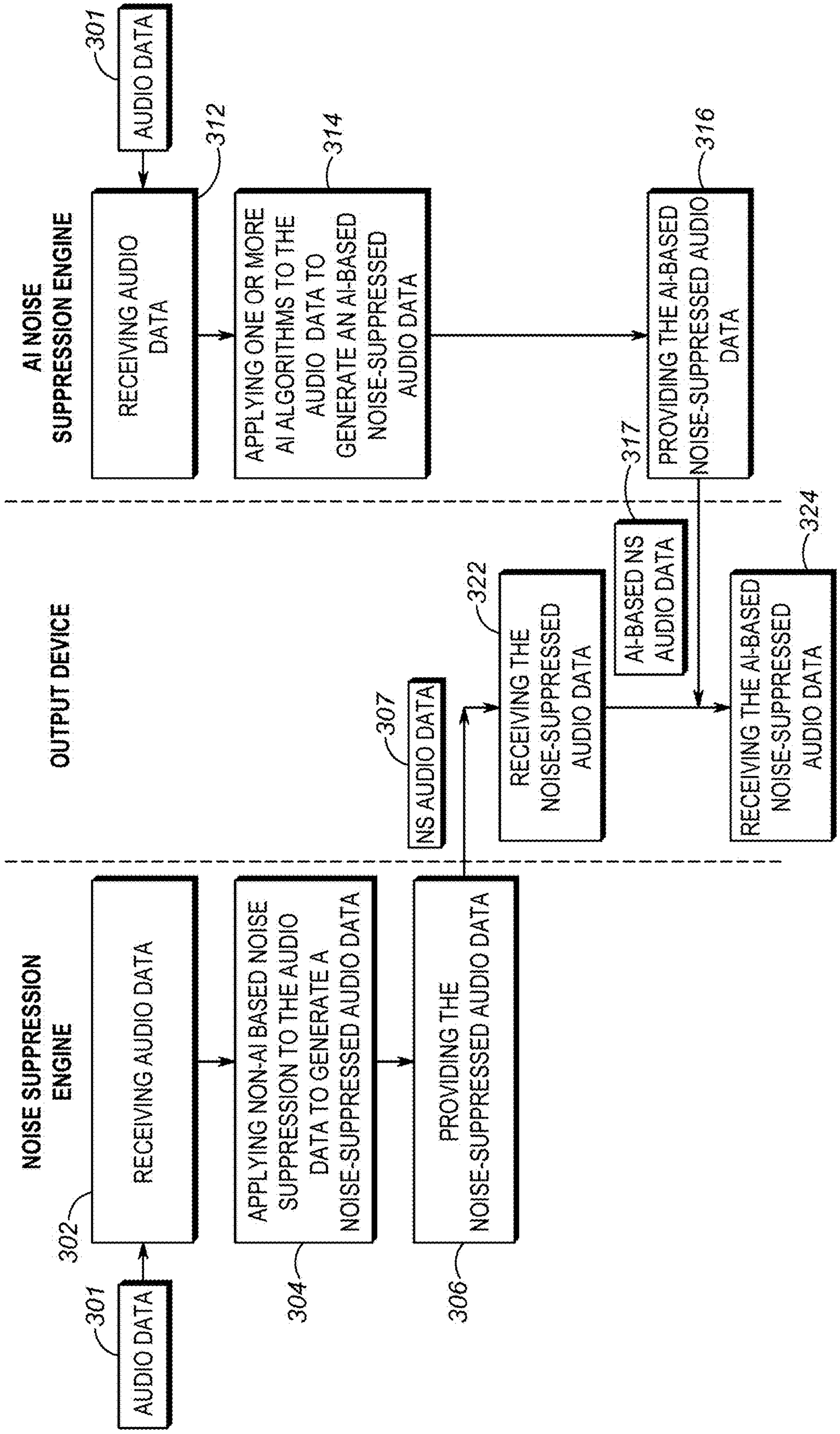
FIG. 3 is a flowchart of a process for AI-based noise suppression, in accordance with some examples.

Attention is now directed to FIG. 3, which depicts a flowchart representative of a process 300 for AI-based noise suppression. The operations of the process 300 of FIG. 3 correspond to the engines 112, 116 and the output device 104 and/or machine readable instructions that are executed by the processors 120, 122. The process 300 of FIG. 3 is one way that the device 100 may be configured. Furthermore, the following discussion of the process 300 of FIG. 3 will lead to a further understanding of the device 100, and its various components.

The process 300 of FIG. 3 need not be performed in the exact sequence as shown and likewise various blocks may be performed in parallel rather than in sequence. Accordingly, the elements of process 300 are referred to herein as “blocks” rather than “steps.” The process 300 of FIG. 3 may be implemented on variations of the device 100 of FIG. 1, as well.

Furthermore, it is understood that the blocks 302 to 308 are performed by the noise suppression engine 112 and/or the processor 120, and the blocks 312 to 318 are performed by the AI noise suppression engine 116 and/or the audio processor 122.

Furthermore, it is understood that the blocks 302 to 308 may be performed by the noise suppression engine 112 and/or the processor 120 in parallel with the blocks 312 to 318 performed by the AI noise suppression engine 116 and/or the audio processor 122.

At a block 302, the noise suppression engine 112 and/or the processor 120 receives audio data 301, for example from the microphone 102 and/or the audio codec engine 110. The audio data may generally comprise voice data and/or voice communications, for example due to an operator of the device 100 speaking into the microphone 102, and the like. The audio data may, however, generally include noise.

At a block 304, the noise suppression engine 112 and/or the processor 120, applies non-AI-based noise suppression to the audio data 301 to generate noise-suppressed audio data 307, for example using the one or more non-AI filters and/or algorithms 114.

At a block 306, the noise suppression engine 112 and/or the processor 120 provides the noise-suppressed audio data 307 to the output device 104. The output device 104 receives the noise-suppressed audio data 307 at block 322 and outputs the noise-suppressed audio data 307, for example by transmitting the noise-suppressed audio data via the modem 106 and the antenna 108 (not shown).

In some embodiments, the noise suppression engine 112 and/or the processor 120 provides the noise-suppressed audio data 307 directly to the output device 104. In other embodiments, the AI-based noise-suppressed audio data 317 is provided to the output device 104 via other part of the device 100.

At a block 312, the AI noise suppression engine 116 and/or the audio processor 122 receives the audio data 301. The source of the audio data 301 at the AI noise suppression engine 116 and/or the audio processor 122 may depend on the structure of the device 100, and is described in more detail below. In particular, device structures in which the AI noise suppression engine 116 and/or the audio processor 122 receives the audio data from the microphone 102 (and/or the audio codec engine 110) are described with respect to FIG. 4 and FIG. 5; and device structure in which the AI noise suppression engine 116 and/or the audio processor 122 receives the audio data from the noise suppression engine 112 (and/or the processor 120) is described with respect to FIG. 8.

At a block 314, the AI noise suppression engine 116 and/or the audio processor 122 applies the one or more AI algorithms 118 to the audio data 301 to train the AI algorithms 118 and to generate the AI-based noise-suppressed audio data 317.

At a block 316, the AI noise suppression engine 116 and/or the audio processor 122 provides the AI-based noise-suppressed audio data 317 to the output device 104. In some embodiments, the AI noise suppression engine 116 and/or the audio processor 122 provides the AI-based noise-suppressed audio data 317 directly to the output device 104. In other embodiments, the AI-based noise-suppressed audio data 317 is provided to the output device 104 via other part of the device 100 (e.g., via the noise suppression engine 112). Providing the AI-based noise-suppressed audio data 317 to the output device 104 may be triggered by the switch 124 (as described with respect to FIG. 2 and further described below) or by any other part of the device 100 that is configured to provide the functionality of switching between the noise-suppressed audio data 307 and the AI-based noise-suppressed audio data 317.

The process 300 may be adapted to include any suitable features.

For example, when the device 100 includes the audio codec engine 110, at the block 302, the noise suppression engine 112 and/or the processor 120 may receive the audio data 301 from the microphone 102 via the audio codec engine 110. Similarly, at the block 312, the AI noise suppression engine 116 and/or the audio processor 122 may receive the audio data 301 from the noise suppression engine 112 (and/or the processor 120), or the microphone 102 via the audio codec engine 110. Furthermore, when the microphone 102 comprises a microphone array, the AI noise suppression engine 116 may receive the audio data 301 from: the noise suppression engine 112; or the microphone array via the audio codec engine 110.

Furthermore, when the microphone 102 comprises a microphone array, at the block 304, and/or prior to the block 304, the noise suppression engine 112 and/or the processor 120 prior to applying the non-AI-based noise suppression to the audio data 301, may perform beamforming on the audio data 301 as received from the microphone array. However, in other examples, the device 100 may be provided with a separate beamforming engine (e.g., implemented by the processor 120 or another processor) which performs the beamforming. In general, a beamforming process identifies portions of the audio data 301 that corresponds to audio data of interest, for example from a particular direction, and filters out other audio data, such that the audio data that corresponds to audio data of interest remains, and the other audio data is discarded. For example, a portion of the microphone array may receive sound of a voice of an operator of the device 100 and audio data generated by such a portion of the microphone array may be kept in the beamforming process while other audio data from other portions of the microphone array may be discarded.

Similarly, when the microphone 102 comprises a microphone array, and in examples where the AI noise suppression engine 116 and/or the audio processor 122 receives the audio data from the microphone 102 (and/or the audio codec engine 110), at the block 312, the AI noise suppression engine 116 and/or the audio processor 122 may receive the audio data from the microphone 102 by receiving the audio data 301 from the microphone array. At the block 314, and/or prior to the block 314, the AI noise suppression engine 116 and/or the audio processor 122, prior to applying the one or more AI algorithms 118 to the audio data, may perform beamforming on the audio data to generate beamformed audio data. Hence, in this example, at the block 314, the AI noise suppression engine 116 and/or the audio processor 122 may apply the one or more AI algorithms 118 to the beamformed audio data to generate the AI-based noise-suppressed audio data 317.

However, in other examples, when the microphone 102 comprises a microphone array, and in examples where the AI noise suppression engine 116 and/or the audio processor 122 receives the audio data from the noise suppression engine 112, at the block 304 and/or prior to the block 304, the noise suppression engine 112 and/or the processor 120, prior to applying non-AI-based noise suppression to the audio data, may perform beamforming on the audio data 301 to generate beamformed audio data. In this example, the noise suppression engine 112 and/or the processor 120 may provide the beamformed audio data to the AI noise suppression engine 116 and/or the audio processor 122. In this example, the AI noise suppression engine 116 and/or the audio processor 122 may be further configured to: at the block 312, receive the audio data 301 from the noise suppression engine 112 in a form of the beamformed audio data; and apply, at the block 314, the one or more AI algorithms 118 to the audio data 301, in the form of the beamformed audio data, to generate the AI-based noise-suppressed audio. Such examples are described with respect to FIG. 8.

It is further understood that the blocks 302 to 306 may generally repeat such that, as further audio data is received, the noise suppression engine 112 and/or the processor 120 continues to generate the noise-suppressed audio data 307 and provide it to the output device 104, until the device 100 starts to provide the AI-based noise-suppressed audio data 317 to the output device. Similarly the blocks 312 to 316 may generally repeat such that, as further audio data is received, the AI noise suppression engine 116 and/or the audio processor 122 continues to apply and train the one or more AI algorithms 118. Hence, as noise conditions at the device 100 change, the AI-based noise suppression may change as the AI algorithms are updated according to such changes.

Figure 4:
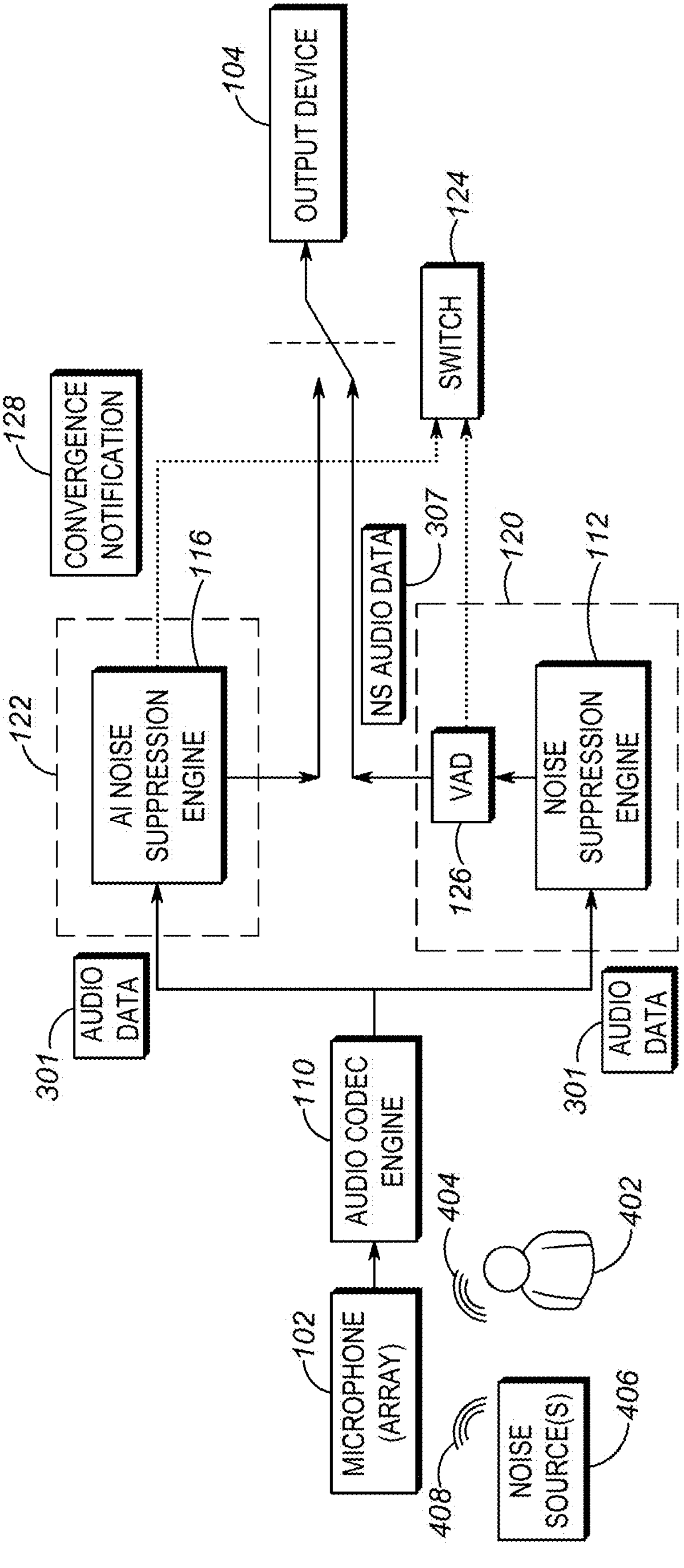
FIG. 4 depicts the device structure of FIG. 2 implementing the process for AI-based noise suppression, in accordance with some examples.
Figure 5:
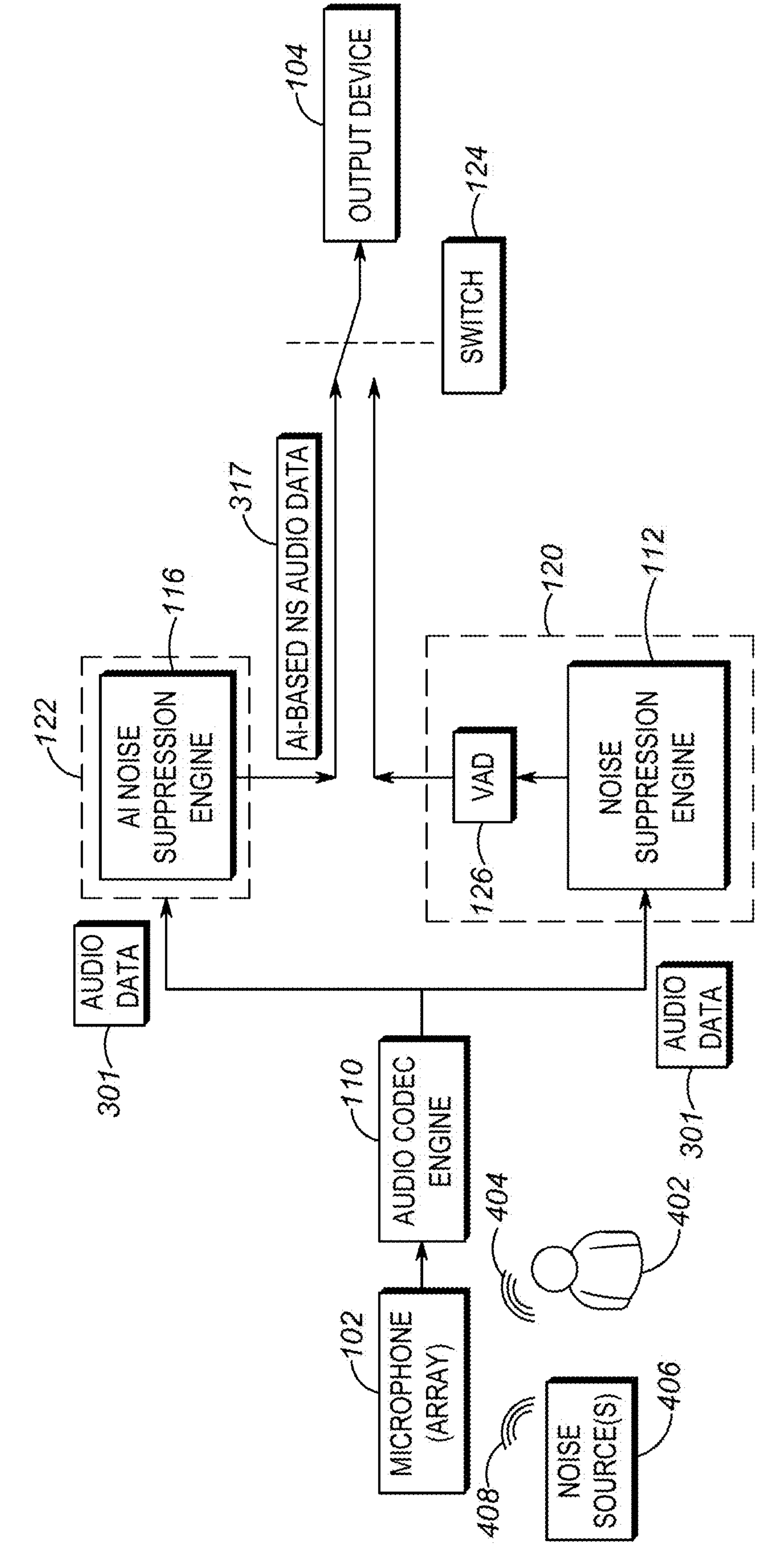
FIG. 5 depicts the device structure of FIG. 2 continuing to implement the process for AI-based noise suppression, in accordance with some examples.

Examples of the process 300 are next described with respect to FIG. 4 and FIG. 5, which are substantially similar to FIG. 2 with like components having like numbers and wherein some parts of the device 100 (for example, modem 106 or AI algorithms 118) were omitted to simplify the drawing.

As depicted in FIG. 4, an operator of the device 100 is speaking into the microphone 102, for example producing sound 404, but there are also one or more noise sources 406 nearby that are producing noise 408. Both the sound 404 and the noise 408 are detected by the microphone 102.

As depicted, audio data 301 is generated, for example by a combination of the microphone 102 and the audio codec engine 110, and the audio data 301 is received at both the noise suppression engine 112 (e.g., at the block 302 of the process 300) and the AI noise suppression engine 116 (e.g., at the block 312 of the process 300).

As the audio data 301 is received at the noise suppression engine 112, the noise suppression engine 112 applies noise suppression to the audio data 301 (e.g., at the block 304 of the process 300) to generate noise-suppressed audio data 307 (e.g., using the one or more non-AI filters and/or algorithms 114). The noise suppression engine 112 provides (e.g., at the block 306 of the process 300) the noise-suppressed audio data 307 to the output device 104.

The AI noise suppression engine 116 also receives the audio data 301 and, while the noise suppression engine 112 is generating the noise-suppressed audio data 307, the AI noise suppression engine 116 applies the one or more AI algorithms 118 to the audio data 301 to train the AI algorithms 118 and to generate (e.g., at the block 314 of the process 300) the AI-based noise-suppressed audio data 317. The AI algorithms have to be trained (at least partially) to reach a quality of noise suppression better than provided by the noise suppression engine 112. Hence, the AI-based noise-suppressed audio data 317, even if generated, is not provided to the output device 104 during the first period of time (e.g. at the beginning of an audio processing).

Once the AI algorithms reach convergence, the convergence notification 128 may be sent to the switch 124. However, as described with respect to FIG. 2, the switch may not change the input of the output device 104 until the VAD signal indicates an absence of speech, to ensure smooth switching.

Attention is next directed to FIG. 5, which is understood to follow, in time, the example of FIG. 4. As depicted in FIG. 5, the AI-based noise-suppressed audio data 317 is provided to the output device 104 during a second period of time.

In some embodiments the switch may also switch off an audio path between the microphone 102 (or the audio codec engine 110) and the noise suppression engine, as neither the noise-suppressed audio data 307 nor the VAD signal are used during the second period of time (i.e. till the end of the current session of audio processing, for example till the end of a call).

Hence, the noise-suppressed audio data 307 is first provided to the output device 104 and later followed by the AI-based noise-suppressed audio data 317, which may have more noise suppressed than in the noise-suppressed audio data 307. When the noise-suppressed audio data 307, and later the AI-based noise-suppressed audio data 317, is received at another communication device and converted to sound, a listener may initially hear the noise-suppressed audio data 307 and, when the AI-based noise-suppressed audio data 317 is converted to sound, the listener may hear an improvement in the noise suppression (e.g., as compared to the noise-suppressed audio data 307). For example, noise of a crying baby in the noise-suppressed audio data 307 may be suppressed in the AI-based noise-suppressed audio data 317.

Figure 6A:
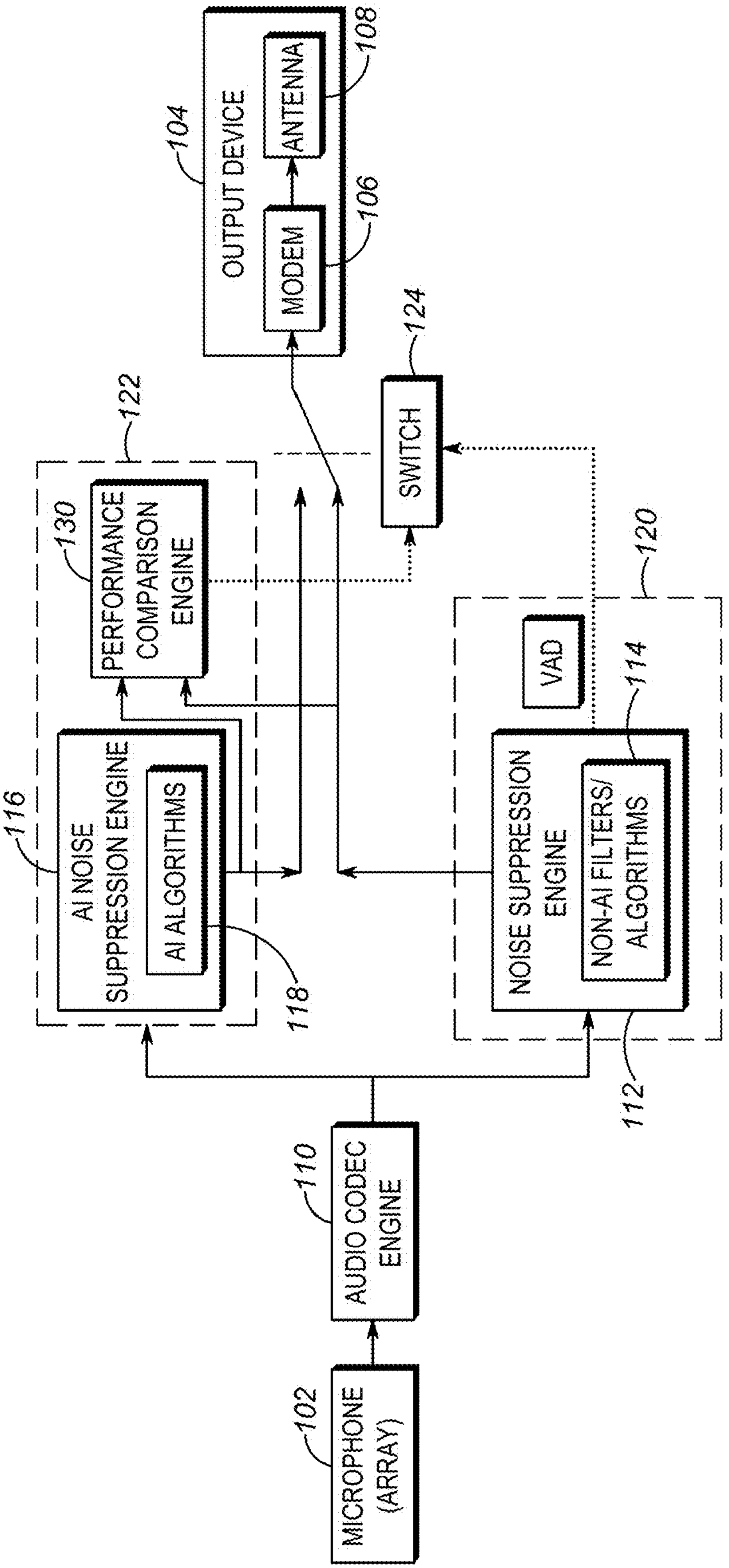
FIG. 6A is a device diagram showing an alternative device structure of the device for AI-based noise suppression, in accordance with some examples.

Attention is next directed to FIG. 6A, which depicts an alternative structure of the device 100. In this example, in contrast to FIG. 2, the switch 124 is not triggered by the convergence notification. Instead, the device 100 implements a dynamic performance evaluation by comparing the noise-suppressed audio data 307 and the AI-based noise-suppressed audio data 317. Therefore, the AI-based noise-suppressed audio data 317 may replace the noise-suppressed audio data 307 as soon as it provides better noise suppressing, which may happen even before reaching full convergence.

To implement the dynamic performance evaluation, the device 100 may comprise a performance comparison engine 130 configured to: receive the noise-suppressed audio data 307; receive the AI-based noise-suppressed audio data 317; determine that the AI-based noise suppression provides better noise suppression than the non-AI-based noise suppression based on the received noise-suppressed audio data 307 and the received AI-based noise-suppressed audio data 317; provide a performance comparison notification to the switch 124, the performance comparison notification indicating that the AI-based noise suppression provides better noise suppression than the non-AI-based noise suppression. The switch 124 may be configured to switch between the noise-suppressed audio data 307 and the AI-based noise-suppressed audio data 317 based on the performance comparison notification (e.g., upon receiving the performance comparison notification). In other words, the device may be configured to trigger providing the AI-based noise-suppressed audio data 317 to the output device 104 based on a reception of the performance comparison notification In some embodiments, the switch 124 of the device 100 of FIG. 6A may receive a VAD signal from a VAD engine as it was described with respect to FIG. 2. In other embodiments (depicted in FIG. 6A), the noise suppression engine 112 is configured to provide the VAD signal to the switch 124.

Although the performance comparison engine 130 is depicted as integrated into the audio processor 122, in some embodiments it can be integrated into the baseband processor 120 or may be external to both of the processors.

Figure 6B:
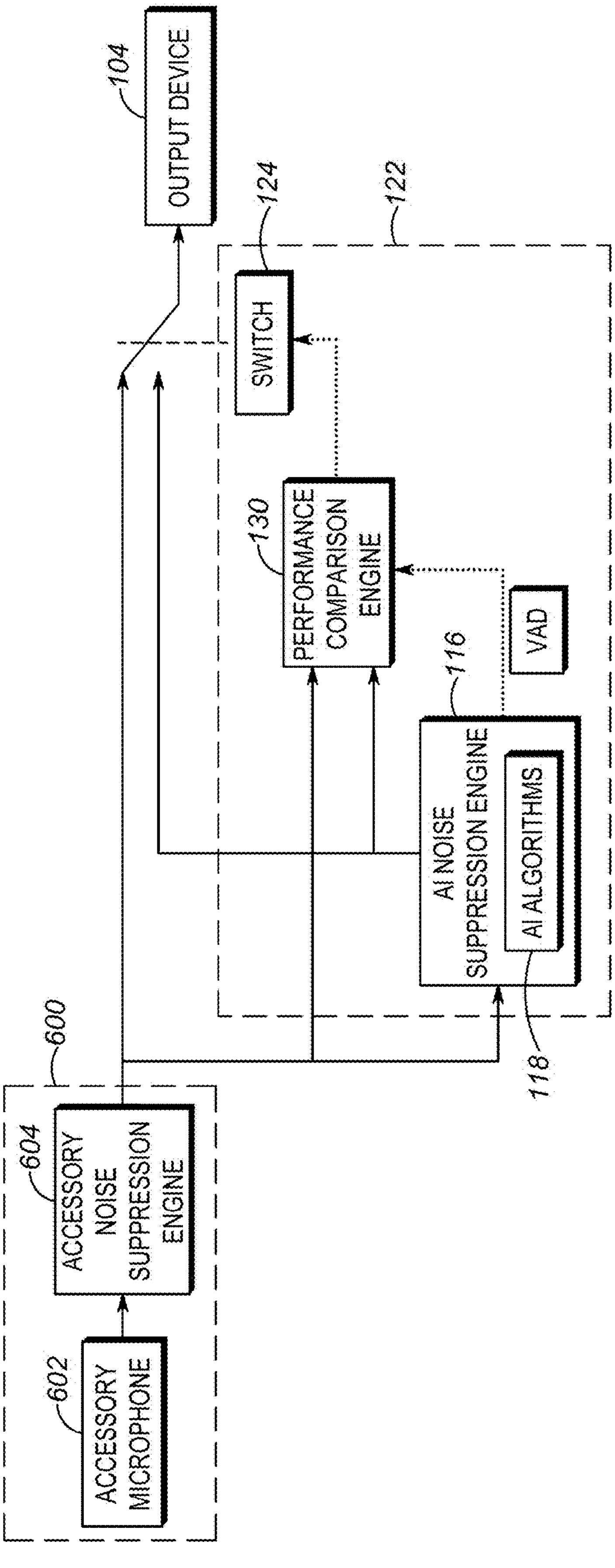
FIG. 6B is a system diagram showing a structure of a system for AI-based noise suppression, in accordance with some examples.

The performance comparison engine 130 may also be used to improve noise suppression in the embodiments as depicted in FIG. 6B, where the device 100 is paired with an audio accessory 600 comprising an accessory microphone 602. Usually audio processing of an accessory audio data (i.e. an audio data generated by the accessory microphone 602) is performed by an accessory noise suppression engine 604 integrated into the audio accessory 600, while the device 100 serves as a pass through to the output device 104. It creates a situation in which the quality of noise suppression is determined by the accessory noise suppression engine 604, even though there is the AI noise suppression engine 116 available in the path. Therefore, in some embodiments it would be beneficial to use the AI noise suppress engine 116 for processing the accessory audio data. On the other hand, some audio accessories may have the accessory noise suppression engine 604 with a very good performance and AI noise suppression would not provide significant improvement, especially if the delay introduced by the AI noise suppression is taken into account.

Therefore, in some embodiments (depicted in FIG. 6B), at the beginning of an audio processing (e.g. at the beginning of the call), the accessory audio data is provided to the accessory noise suppression engine configured to generate noise-suppressed accessory audio data. The noise-suppressed accessory audio data is then provided to the output device 104. The noise-suppressed accessory audio data is in parallel provided to the AI noise suppression engine 116 that applies the one or more AI algorithms 118 to the noise-suppressed accessory audio data to generate the AI-based noise-suppressed accessory audio data. The noise-suppressed accessory audio data and the AI-based noise-suppressed accessory audio data are provided to the performance comparison engine 130, which is configured to: receive the noise-suppressed accessory audio data; receive the AI-based noise-suppressed accessory audio data; determine that the AI-based noise suppression provides better noise suppression than noise suppression provided by the accessory noise suppression engine 604, based on the noise-suppressed accessory audio data and the received AI-based noise-suppressed accessory audio data; and providing a performance comparison notification to trigger the switch 124. The switch 124 may be configured to switch between the noise-suppressed accessory audio data and the AI-based noise-suppressed accessory audio data, upon receiving the performance comparison notification.

The performance comparison engine 130 may also receive a VAD signal (e.g., from the AI noise suppression engine 116). The VAD signal may be used to indicate a section of the noise-suppressed accessory audio data where speech is not detected and identify it as noise. Noise reduction may therefore be calculated as the difference between an input noise (a portion of the noise-suppressed accessory audio data where speech was not detected) and an AI noise-suppressed output noise (the AI-based noise-suppressed accessory audio data generated by applying the one or more AI algorithms 118 to the portion of the noise-suppressed accessory audio data where speech was not detected). In some embodiments, the performance comparison engine may be configured to provide the performance comparison notification only if the noise reduction exceeds a predefined threshold, which may be configurable. Hence, a user may balance between a noise suppression quality and a latency provided by the AI noise suppression.

Although the embodiment depicted in FIG. 6A and described above discloses that the AI noise suppression engine 116 receives the noise-suppressed accessory audio data, in other embodiments the AI noise suppression engine 116 may receive the accessory audio data (from the accessory microphone 602 or from the accessory noise suppression engine 604) and generate the AI-based noise-suppressed audio data by applying the one or more AI algorithms to the accessory audio data.

Attention is next directed to FIG. 7, which depicts yet another alternative structure of the device 100. In this example, the functionality of the switch is provided by the noise suppression engine 112.

Similar to the device structure of FIG. 2, the noise suppression engine 112 and the AI noise suppression engine 116 may receive the audio data 301 from the microphone 402 (e.g., via the audio codec engine 110). The noise suppression engine 112 generates the noise-suppressed audio data 307 and provides the noise-suppressed audio data 307 to the output device 104, while the AI noise suppression engine 116 applies the one or more AI algorithms 118 to the audio data 301 to generate the AI-based noise-suppressed audio data 317. In contrast to FIG. 2, the AI noise suppression engine 116 does not provide the AI-based noise-suppressed audio data 317 to the output device 104. Rather, the AI-based noise-suppressed audio data 317 is provided from the AI noise suppression engine 116 to the noise suppression engine 112. Therefore, the noise suppression engine 112 may act as a switch and start providing the AI-based noise-suppressed audio data 317 to the output device based, for example, on the predefined period of time or the converged notification received from the AI noise suppression engine 116 or the signal from the performance comparison engine or upon receiving the AI-based noise-suppressed audio data 317.

Figure 8:
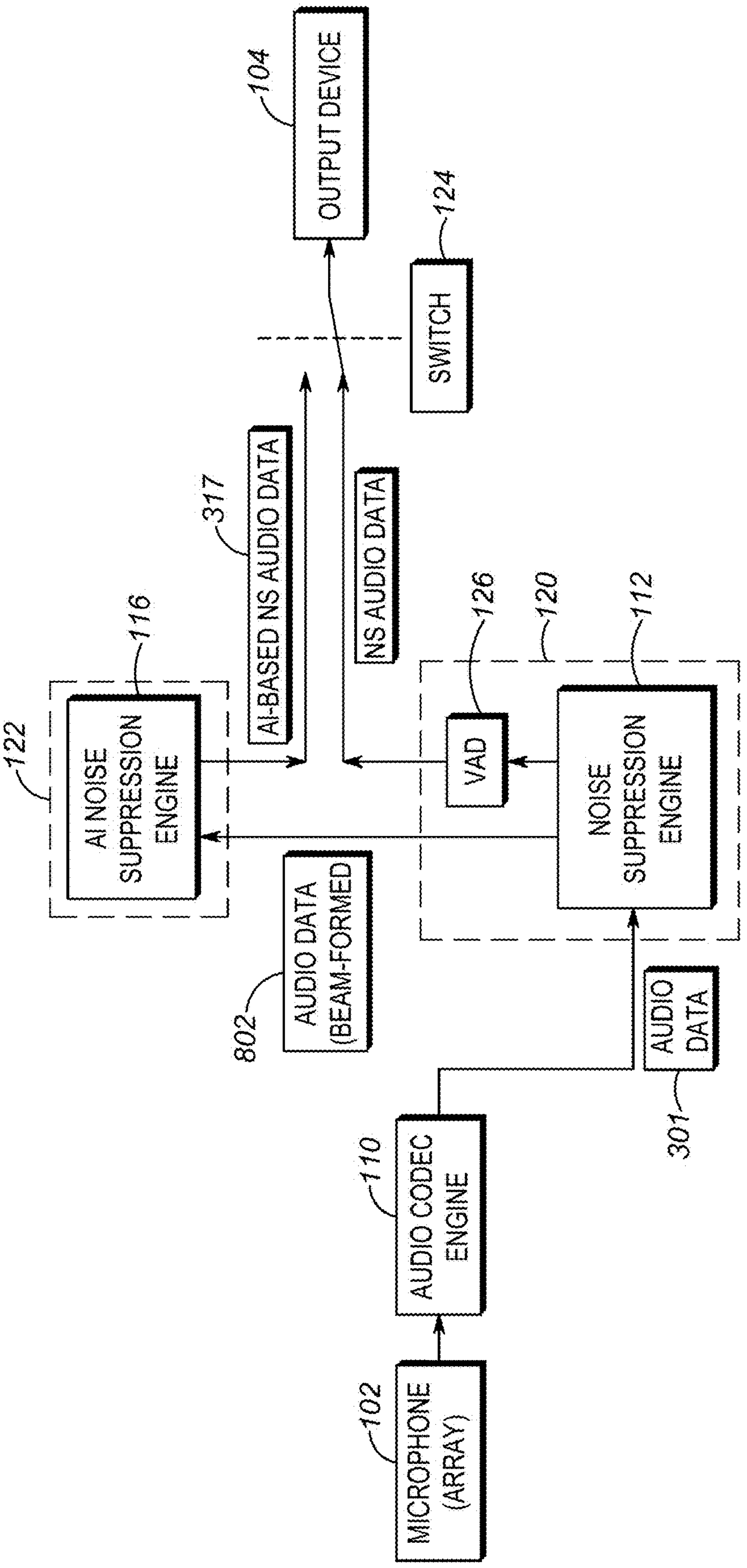
FIG. 8 is a device diagram showing a third alternative device structure of the device for AI-based noise suppression, in accordance with some examples.

Attention is next directed to FIG. 8, which depicts an alternative structure of the device 100. In this example, the noise suppression engine 112 receives the audio data 301 from the microphone 402 (e.g., via the audio codec engine 110), and may convert to beamformed audio data 802. However, in contrast to FIG. 2, the AI noise suppression engine 116, and/or the audio processor 122, receives audio data from the noise suppression engine 112, for example in the form of the beamformed audio data 802. The noise suppression engine 112 generates the noise-suppressed audio data 307 (e.g., from the beamformed audio data 802), and provides the noise-suppressed audio data 307 to the output device 104 (e.g. to the modem 106 such that the noise-suppressed audio data 307 is transmitted via the antenna 108), while the AI noise suppression engine 116 applies the one or more AI algorithms 118 to the beamformed audio data 802 to generate the AI-based noise-suppressed audio data 317. The AI noise suppression engine 116 provides the AI-based noise-suppressed audio data 317 to the output device 104, after the input of the output device 104 is switched from the noise-suppressed audio data 307 to the AI-based noise-suppressed audio data 317.

In some embodiments, the non-AI filters and/or algorithms 114 may be applied to the AI-based noise-suppressed audio data received by the noise suppression engine 112, such that the audio data benefits from noise suppression both due to the non-AI filters and/or algorithms 114 and the one or more AI algorithms 118.

The audio data 301 may be beamformed by the noise suppression engine 112 and provided to the AI noise suppression engine 116 also in other configurations of the device 100, including configurations provided herein.

Figure 9:
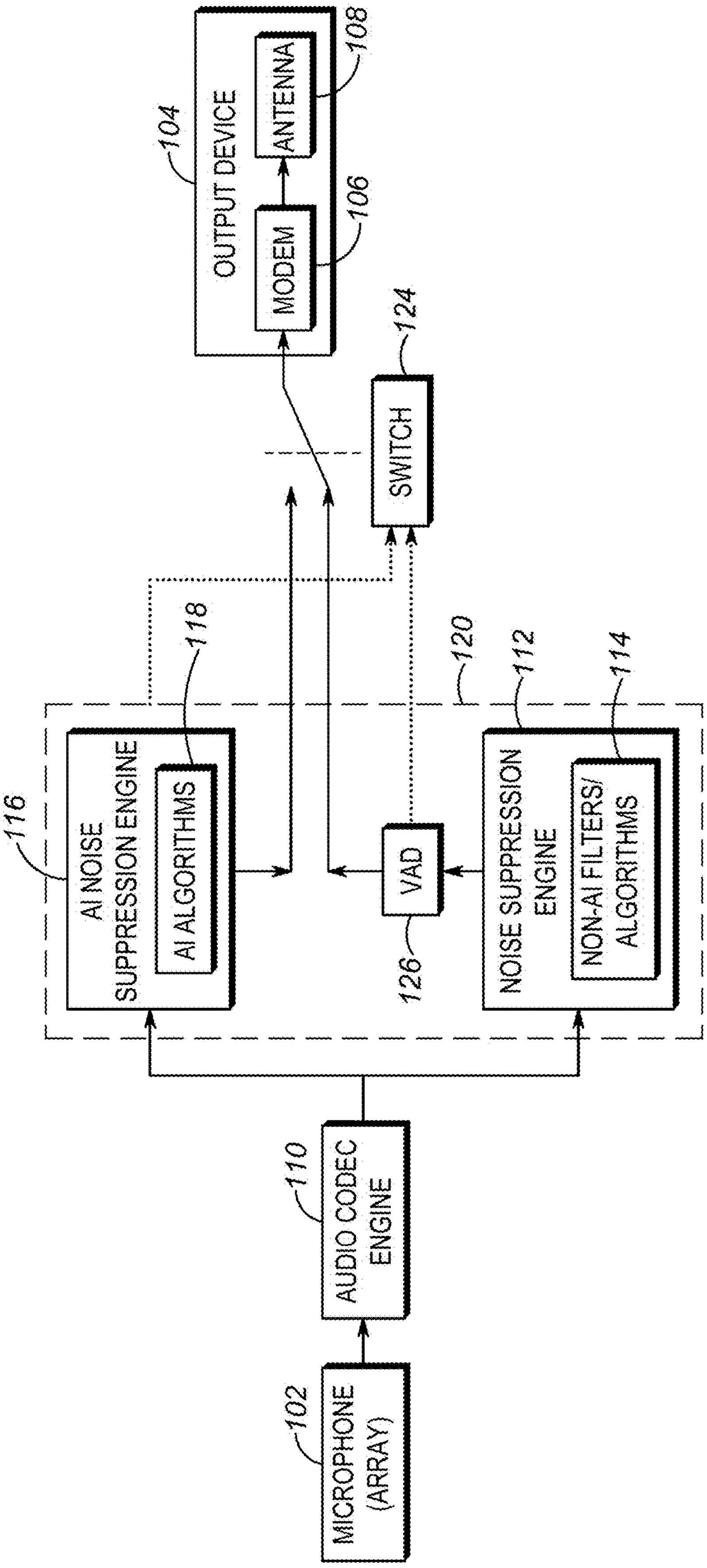
FIG. 9 is a device diagram showing a fourth alternative device structure of the device for AI-based noise suppression, in accordance with some examples.

Attention is next directed to FIG. 9, which depicts yet another alternative structure of the device 100. In this example, both the noise suppression engine 112 and the AI noise suppression engine 116 are implemented, in parallel, at the baseband processor 120. In such an example, it is understood that the baseband processor 120 has been adapted to include sufficient processing power to implement both the noise suppression engine 112 and the AI noise suppression engine 116 in parallel without introducing delays into generation of the noise-suppressed audio data 307 and/or the AI-based noise-suppressed audio data 317.

Similar to the device structure of FIG. 2, the noise suppression engine 112 and the AI noise suppression engine 116 receive the audio data 301 from the microphone 402 (e.g., via the audio codec engine 110). The noise suppression engine 112 generates the noise-suppressed audio data 307 and provides the noise-suppressed audio data 307 to the output device 104 (e.g. the noise-suppressed audio data 307 is provided to the modem 106 such that the noise-suppressed audio data 307 is transmitted via the antenna 108), while the AI noise suppression engine 116 applies the one or more AI algorithms 118 to the audio data 301 to generate the AI-based noise-suppressed audio data 317. The AI noise suppression engine 116 provides the AI-based noise-suppressed audio data 317 to the to the output device 104, after the device 100 changes input into the output device from the noise-suppressed audio data 307 to the AI-based noise-suppressed audio data 317.

In some of these examples, at the baseband processor 120, the noise suppression engine 112 may have higher priority than the AI noise suppression engine 116. Put another way, the baseband processor 120 may execute and/or implement the AI noise suppression engine 116 once finished executing the noise suppression engine 112, and/or while the noise suppression engine 112 is not being executed and/or implemented. For example, the audio data 301 may be received in portions and/or sections (e.g. as an operator of the device 100 starts and then stops talking), and the baseband processor 120 may implement the noise suppression engine 112 to generate the noise-suppressed audio data 307 for a first portion and/or section of the audio data 301 to minimize delays in providing the noise-suppressed audio data 307 to the output device 104, and once the noise suppression engine 112 stops generating the noise-suppressed audio data 307, the baseband processor 120 may implement the AI noise suppression engine 116 to train the one or more AI algorithms 118; however, training of the one or more AI algorithms 118 may be interrupted when further audio data 301 is received (e.g. prior to reaching convergence by the one or more AI algorithms 118) to again generate the noise-suppressed audio data 307 via the noise suppression engine 112. Implementation of the AI noise suppression engine 116 to continue and/or complete training of the one or more AI algorithms 118 may occur once the noise suppression engine 112 again stops generating the noise-suppressed audio data 307. The AI noise suppression engine 116, once the one or more AI algorithms 118 reach convergence, may provide the AI-based noise-suppressed audio data 317 to the output device 104. Hence, as both the engines 112, 116 are being implemented by the same baseband processor 120, such a priority scheme may ensure that the device 100 can still meet given audio delay specifications.

Figure 10:
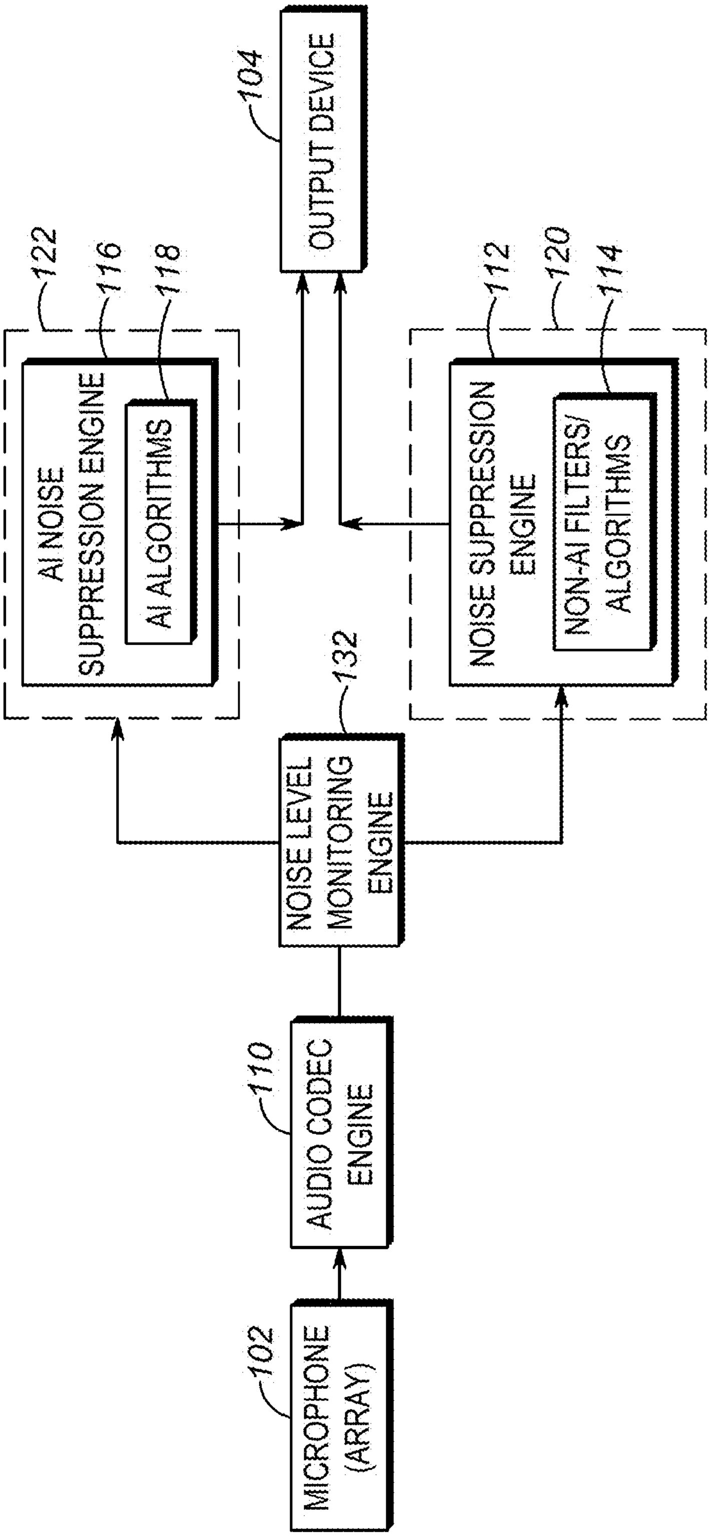
FIG. 10 is a device diagram showing a device structure of the device for implementing an alternative solution.

Attention is next directed to FIG. 10, which depicts yet another alternative structure of the device 100. In this example, the device 100 comprises a noise level monitoring engine 132. The noise level monitoring engine 132 is configured to determine a noise level of the audio data received from the microphone 102 or the audio codec 110. The noise level may be determined based on energy calculations. The noise level monitoring engine 132 may be further configured to: provide the audio data to the noise suppression engine 112 if the noise level of the audio data is below a predefined noise level threshold; and to provide the audio data to the AI noise suppression engine 116 if the noise level of the audio data is equal to or above the predefined noise level threshold. The predefined noise level threshold may be configurable (e.g., via a customer programming software). Such structure of device 100 enables battery savings, since the AI-based noise reduction is not used at all for a low noise situation.

Although depicted as external to both of the processors 120, 122, the noise level monitoring engine 132 may be also integrated into the baseband processor 120.

The structure of the device 100 as depicted in FIG. 10 may be combined with other features described herein. For example, the device 100 may comprise the switch 124 or the noise level monitoring engine 132 may be configured to implement the functionality of switch 124. In such an example, detecting the noise level equal to or above the predefined noise level threshold initiates the process as described above, i.e. upon detecting that the noise level of the audio data meets or exceeds the predefined noise level threshold, the audio data is provided to the AI noise suppressed engine 116 and to the noise suppression engine 112 and the noise suppression engine 112 provides the noise suppressed audio to the output device 104 until the AI noise suppression engine reaches convergence. The switch 124 or the noise level monitoring engine 132 may be configured to trigger providing the AI-based noise-suppressed audio to the output device 104 as described with relation to other figures.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, beamform audio data, perform noise suppression on audio data, transmit audio data, and the like).

In the foregoing specification, specific embodiments have been described. However, one of ordinary skill in the art appreciates that various modifications and changes can be made without departing from the scope of the invention as set forth in the claims below. Moreover, it is contemplated that: any part of any aspect, example, or embodiment discussed in this specification can be implemented or combined with any part of any other aspect, example or embodiment discussed in this specification; and any feature described with relation to any aspect, example, or embodiment, may be omitted, if not disclosed as essential. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially”, “essentially”, “approximately”, “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “one of”, without a more limiting modifier such as “only one of”, and when applied herein to two or more subsequently defined options such as “one of A and B” should be construed to mean an existence of any one of the options in the list alone (e.g., A alone or B alone) or any combination of two or more of the options in the list (e.g., A and B together). Similarly the terms “at least one of” and “one or more of”, without a more limiting modifier such as “only one of”, and when applied herein to two or more subsequently defined options such as “at least one of A or B”, or “one or more of A or B” should be construed to mean an existence of any one of the options in the list alone (e.g., A alone or B alone) or any combination of two or more of the options in the list (e.g., A and B together).

A device or structure that is “configured” in a certain way is configured in at least that way, but may also be configured in ways that are not listed.

The terms “coupled”, “coupling” or “connected” as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or “processing devices”) such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the “C” programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:

a microphone;

an output device;

a noise suppression engine configured to: receive audio data from the microphone; apply noise suppression to the audio data to generate a noise-suppressed audio data;

an Artificial Intelligence (AI) noise suppression engine configured to: receive the audio data from the microphone or the noise suppression engine; apply one or more AI algorithms to the audio data to generate an AI-based noise-suppressed audio data;

the device further configured to:

perform during a first period of time: applying the one or more AI algorithms to the audio data; applying the noise suppression to the audio data to generate the noise-suppressed audio data; and providing the noise-suppressed audio data to the output device; and perform during a second period of time, the second period of time following the first period of time: applying, by the AI noise suppression engine, the one or more AI algorithms to the audio data to generate the AI-based noise-suppressed audio data; and providing, by the AI noise suppression engine, the AI-based noise-suppressed audio data to the output device.

2. The device of claim 1, further configured to trigger providing the AI-based noise-suppressed audio data to the output device based on reaching convergence by the one or more AI algorithms.

3. The device of claim 1, further configured to trigger providing the AI-based noise-suppressed audio data to the output device based on a relative comparison of noise suppression performance.

4. The device of claim 1, further comprising a switch configured to trigger providing the AI-based noise-suppressed audio data to the output device.

5. The device of claim 4, wherein the switch is configured to trigger providing the AI-based noise-suppressed audio data to the output device based on a predefined period of time.

6. The device of claim 5, wherein the predefined period of time is a convergence time determined for the one or more AI algorithms.

7. The device of claim 4, wherein the switch is configured to trigger providing the AI-based noise-suppressed audio data to the output device based on a reception of a convergence notification.

8. The device of claim 4, further comprising:

a performance comparison engine configured to: determine that the AI noise suppression engine provides relatively better noise suppression performance than the noise suppression engine; and provide a performance comparison notification, wherein the switch is configured to trigger providing the AI-based noise-suppressed audio data to the output device based on a reception of the performance comparison notification.

9. The device of claim 1, further configured to trigger providing the AI-based noise-suppressed audio data to the output device at a time during a non-speech section of the noise-suppressed audio data.

10. The device of claim 4, wherein the switch is implemented by the noise suppression engine.

11. The device of claim 1, further configured to: provide the audio data to the noise suppression engine if a noise level of the audio data is below a predefined noise level threshold; and to provide the audio data to the AI noise suppression engine if the noise level of the audio data is equal to or above the predefined noise level threshold.

12. The device of claim 1, further comprising:

a baseband processor configured to implement the noise suppression engine; and an audio processor configured to implement the AI noise suppression engine in parallel with the baseband processor implementing the noise suppression engine, the baseband processor and the audio processor in communication with each other.

13. The device of claim 1, further comprising:

a baseband processor configured to implement the noise suppression engine and the AI noise suppression engine in parallel.

14. The device of claim 1, wherein the microphone and the noise suppression engine are integrated into an audio accessory.

15. A system comprising a device and an audio accessory, wherein the audio accessory comprises:

an accessory microphone; and an accessory noise suppression engine configured to: receive an accessory audio data from the accessory microphone; and apply a noise suppression to the accessory audio data to generate a noise-suppressed accessory audio data;

and wherein the device comprises:

an output device; and an Artificial Intelligence (AI) noise suppression engine configured to: receive the accessory audio data or the noise-suppressed accessory audio data; and apply one or more AI algorithms to the accessory audio data or the noise-suppressed accessory audio data to generate an AI-based noise-suppressed accessory audio data;

the system further configured to:

perform during a first period of time: applying the noise suppression to the accessory audio data to generate the noise-suppressed accessory audio data; applying the one or more AI algorithms to the accessory audio data or the noise-suppressed accessory audio data; and providing the noise-suppressed accessory audio data to the output device; and perform during a second period of time, the second period of time following the first period of time: applying, by the AI noise suppression engine, the one or more AI algorithms to the accessory audio data or the noise-suppressed accessory audio data to generate the AI-based noise-suppressed accessory audio data; and providing, by the AI noise suppression engine, the AI-based noise-suppressed accessory audio data to the output device.

16. A method comprising:

receiving, at a noise suppression engine, audio data from a microphone;

receiving, at an Artificial Intelligence (AI) noise suppression engine, the audio data from the microphone or the noise suppression engine;

performing during a first period of time: applying one or more AI algorithms to the audio data; applying a noise suppression to the audio data to generate a noise-suppressed audio data; and providing the noise-suppressed audio data to an output device; and performing during a second period of time, the second period of time following the first period of time: applying, by the AI noise suppression engine, the one or more AI algorithms to the audio data to generate an AI-based noise-suppressed audio data; and providing, by the AI noise suppression engine, the AI-based noise-suppressed audio data to the output device.

17. The method of claim 16, further comprising triggering of providing the AI-based noise-suppressed audio data to the output device based on the one or more of:

reaching convergence by the one or more AI algorithms, a relative comparison of noise suppression performance, a predefined period of time, a reception of a convergence notification, a reception of a performance comparison notification, a noise level of the audio data.

18. The method of claim 16, further comprising triggering of providing the AI-based noise-suppressed audio data to the output device at a time during a non-speech section of the noise-suppressed audio data.

19. The method of claim 16, further comprising:

implementing the noise suppression engine at a baseband processor; and implementing the AI noise suppression engine at an audio processor in parallel with the baseband processor implementing the noise suppression engine.

20. The method of claim 16, further comprising:

implementing the noise suppression engine and the AI noise suppression engine in parallel at a baseband processor.

* * * * *